United States Patent [19]
Ono et al.

[11] Patent Number: 6,075,433
[45] Date of Patent: Jun. 13, 2000

[54] POWER SUPPLY UNIT

[75] Inventors: Makoto Ono, Matsusaka; Yoshiyuki Nakai, Ise; Hideki Okura, Ichishi-gun; Satoru Taniguchi, Matsusaka, all of Japan

[73] Assignee: Matsushita Electric Industrial Co., Ltd., Osaka, Japan

[21] Appl. No.: 08/952,118

[22] PCT Filed: May 22, 1996

[86] PCT No.: PCT/JP96/01353

§ 371 Date: Mar. 12, 1999

§ 102(e) Date: Mar. 12, 1999

[87] PCT Pub. No.: WO96/38898

PCT Pub. Date: Dec. 5, 1996

[30]    Foreign Application Priority Data

| May 29, 1995 | [JP] | Japan | 7-130116 |
| Sep. 1, 1995 | [JP] | Japan | 7-224853 |
| Oct. 30, 1995 | [JP] | Japan | 7-281258 |

[51] Int. Cl.$^7$ .................................................... H01F 27/24
[52] U.S. Cl. ...................................... 336/212; 336/DIG. 2
[58] Field of Search ............................... 336/212, DIG. 2, 336/170; 320/108

[56]    References Cited

U.S. PATENT DOCUMENTS

| 1,481,904 | 1/1924 | Hendricks, Jr. | 336/107 |
| 3,510,747 | 5/1970 | Petrides | 320/59 |
| 3,743,989 | 7/1973 | Nicolas et al. | 336/5 |
| 4,038,625 | 7/1977 | Tompkins et al. | 336/83 |
| 5,379,021 | 1/1995 | Ito et al. | 336/83 |
| 5,594,317 | 1/1997 | Yeow et al. | 320/2 |
| 5,680,028 | 10/1997 | McEachern | 336/DIG. 2 |
| 5,909,100 | 6/1999 | Watanabe et al. | 320/108 |

FOREIGN PATENT DOCUMENTS

| 58-93433 | 6/1983 | Japan . |
| 63-73837 | 4/1988 | Japan . |
| 1-163950 | 6/1989 | Japan . |
| 6-105486 | 4/1994 | Japan . |
| 6-506099 | 7/1994 | Japan . |
| 6-311659 | 11/1994 | Japan . |
| 6-311660 | 11/1994 | Japan . |
| 6-319232 | 11/1994 | Japan . |
| 7-106170 | 4/1995 | Japan . |
| 8-78257 | 3/1996 | Japan . |
| 8-103028 | 4/1996 | Japan . |

*Primary Examiner*—Michael L. Gellner
*Assistant Examiner*—Anh Mai
*Attorney, Agent, or Firm*—McDermott, Will & Emery

[57]    ABSTRACT

The present invention relates to a non-contact type power supply unit intended for use in electronic equipment, aiming at the realization of a small size and low cost and successful achievement in an enhanced capability of electric power transmission. In order to achieve the foregoing objectives, the non-contact type power supply unit comprises a primary coil(11) that is fed with pulsated currents, a secondary coil(13) mounted opposite to the primary coil(11) in an enclosure that is different from an enclosure wherein the primary coil(11) is mounted, whereby electric power is transferred from the primary coil(11) to the secondary coil(13) and wherein a ferrite core(12) is disposed so as to extend from the primary coil(11) towards the secondary coil(13), thus achieving efficient electric power transmission from the primary coil(11) to secondary coil(13).

4 Claims, 10 Drawing Sheets

Magnetic flux

POWER SUPPLY UNIT

FIELD OF THE INVENTION

The present invention relates to a non-contact type power supply unit for use in small portable equipment such as cordless telephones, portable telephones, PHS phones, video cameras, personal computers and the like.

BACKGROUND OF THE INVENTION

A non-contact type power supply unit is characterized by transferring electric power from a primary side to a secondary side, and since the primary side circuit and secondary side circuit are packaged in separate enclosures that are completely independent from each other, it is very important to establish magnetic coupling between a primary transformer and a secondary transformer of the non-contact type power supply unit for efficient transfer of electric power. In order to achieve an improvement in the magnetic coupling, use of E—E cores is considered effective. Also, it has been a usual practice to make the opposing area between the primary coil and the secondary coil of the transformers as large as possible for better magnetic coupling.

An explanation will be given to prior art technologies in the following with reference to FIG. 8 to FIG. 10.

FIG. 8 shows a structure wherein E type cores are used as a primary core 1 and also a secondary core 5. A primary coil 2 is placed in the slot of the primary core 1 (E type core), thereby forming a primary transformer 4. Also, a secondary coil 6 is placed in the slot of the secondary core 5 (E type core), thereby forming a secondary transformer 8. Reference numerals 3 and 7 indicate a primary bobbin and a secondary bobbin, respectively.

Next, how the foregoing structure works will be explained. When high frequency currents flow in the primary coil 2 formed of windings wound concentrically, magnetic fluxes are produced in the primary coil 2 and primary core 1. The foregoing magnetic fluxes are propagated to the secondary core 5 and secondary coil 6 and converted to electric power, which is then supplied to load.

FIG. 9 shows a structure wherein the opposing area between the primary coil 2 and the secondary coil 6 is made large in order to intensify the magnetic coupling between windings.

Also, in order to increase the foregoing magnetic coupling, an arrangement is made to dispose the secondary coil 6 and the primary coil 2 concentrically as shown in FIG. 10(a).

Further, there has been provided a structure, wherein a mechanical switch 8a and a magnetic switch 9a are used together in order to enable the primary coil to tell whether what receives electric power from the primary coil is the secondary coil or some other foreign objects and also to reduce a supply of electric power to the foreign objects, thereby preventing an abnormal heating of the foreign objects from taking place, and when a magnetic field generator 10a installed on a secondary enclosure 5a comes close to the magnetic switch 9a, the magnetic switch 9a is turned on and even when the mechanical switch 8a installed on a primary enclosure 4a is turned on by an object other than the secondary enclosure 5a, an arrangement is made so that electric power is not applied to the primary coil, as shown in FIG. 10(b).

However, with the structure of FIG. 8, wherein open magnetic circuits are formed, the magnetic fluxes from the middle leg 9 of the primary core 1 (E type core) are returned to the outer legs 10 by short circuiting, thus resulting in a reduction of magnetic fluxes that are propagated to the secondary side and ending up with a poor efficiency.

On the other hand, with the structure of FIG. 9, wherein the opposing area between both coils is made large, the dimensions of the primary side and secondary side including the enclosures become extremely large, thereby hindering a unit, wherein this structure is incorporated, from achieving a downsizing.

When the secondary coil 6 and the primary coil 2 are disposed concentrically as shown in FIG. 10(a), the magnetic coupling between the primary coil 2 and the secondary coil 6 is intensified, resulting in an increase of the transmission of electric power. However, the diameter of the primary coil 2 becomes the inner diameter of the secondary coil 6 resulting in the problems of an increase of dimensions of the secondary coil 6 and the like.

Furthermore, when the mechanical switch 8a is provided on the primary enclosure 4a to prevent an abnormal heating of foreign objects as shown in FIG. 10(b), electrical contacts once eliminated by employing a non-contact structure are used again, thereby bringing about the danger of failure in contacts and also making it difficult to make the direct current power supply unit in a hermetically sealed construction or a water-proof construction. In addition, use of the magnetic switch 9a such as a Hall effect device and the like has caused such problems as a difficulty for the magnetic switch 9a to tell distinctly the difference between a heat producing object other than the secondary enclosure 5a when the foregoing object is made of a magnetic substance and the like and the secondary transformer that includes the secondary enclosure 5a, and the like.

The present invention provides an inexpensive and yet reliable power supply unit whereby the shortcomings of the prior art as described in the above are eliminated, a simpler structure is realized, electric power transmission efficiencies are enhanced and a downsizing of the equipment is made possible.

SUMMARY OF THE INVENTION

In order to work out the foregoing problems, a non-contact type power supply unit of the present invention comprises a primary coil to be fed with electric currents, and a secondary coil mounted opposite to the primary coil in an enclosure that is different from an enclosure wherein the primary coil is mounted, whereby electric power is transferred from the primary coil to the secondary coil and wherein a ferrite core is provided on the primary coil extending from the primary coil to the secondary coil, thereby realizing a power supply unit with an enhanced electric power transmission capability and a resulting large electric power output.

PREFERRED EMBODIMENTS OF THE INVENTION (Exemplary Embodiment 1)

An exemplary embodiment of the present invention will be explained below with reference to FIG. 1.

Figure 1:
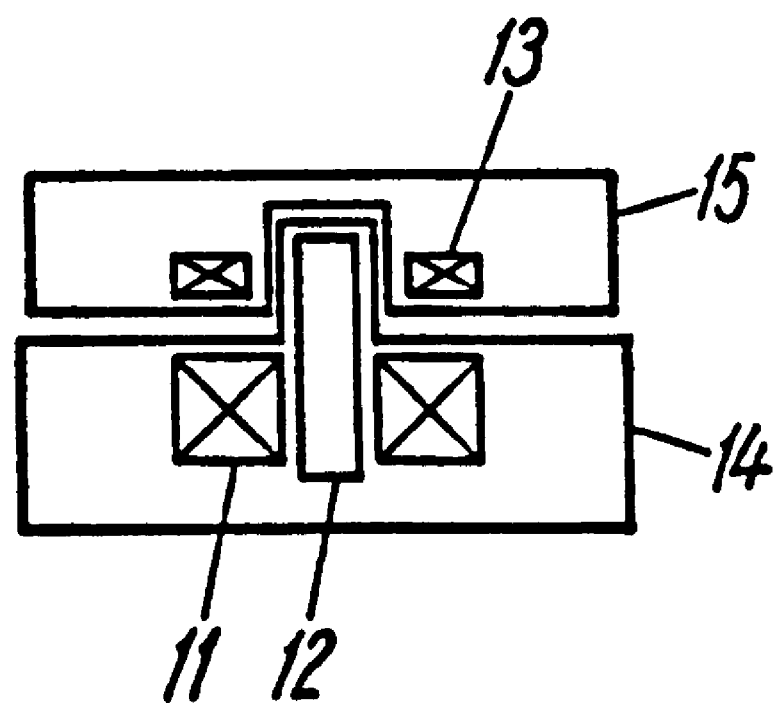
FIG. 1 shows a construction of a transformer performing an important function in an exemplary embodiment of the present invention of a power supply unit.

As shown in FIG. 1, a ferrite core 12 is inserted into a primary coil 11 and arranged to extend towards a secondary coil 13, which is wound around the ferrite core 12. The primary coil 11 is mounted inside of a primary enclosure 14 and the secondary coil 13 is mounted inside of a secondary enclosure 15.

An explanation will be made on how a non-contact type DC power supply unit constructed as described in the above performs.

By the passage of high frequency electric currents through the primary coil 11, magnetic fluxes are produced. Almost all the foregoing magnetic fluxes pass through the ferrite core 12, which penetrates the center of the primary coil 11. By having the above ferrite core 12 extended to the secondary coil 13, it is made possible for the magnetic fluxes produced by the primary coil 11 to be transferred to the secondary coil 13 efficiently.

Since the foregoing ferrite core 12 is a rod type core forming an open magnetic circuit, it is extremely difficult for the ferrite core 12 to be magnetized to saturation, thereby enabling the ferrite core 12 to have a small diameter and contributing greatly to a downsizing of the power supply unit.

(Exemplary Embodiment 2)

Figure 2:
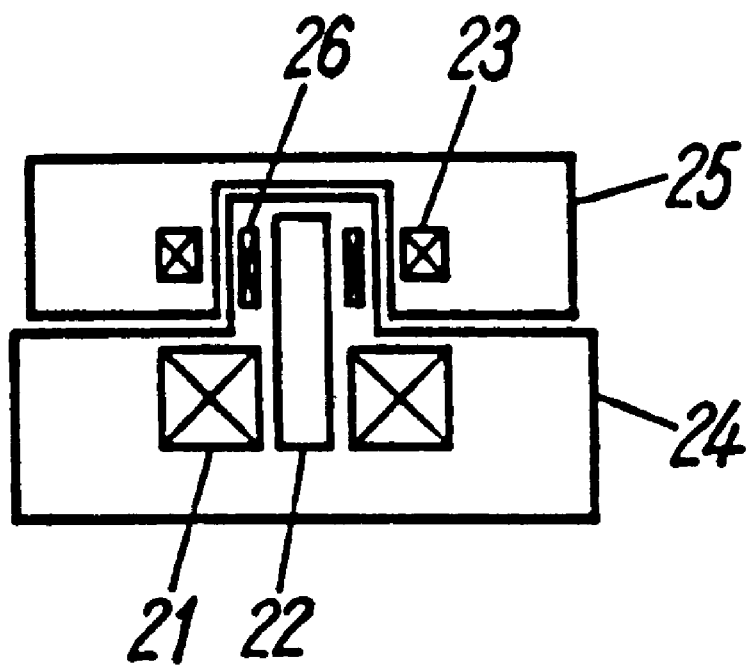
FIG. 2 shows a construction of a transformer performing an important function in another exemplary embodiment of the present invention of a power supply unit.

FIG. 2 shows another exemplary embodiment of the present invention.

In general, the coupling between the primary coil and the secondary coil is very poor with a non-contact type DC power supply unit, and little influence is imposed on the primary coil from the changes in condition of the secondary coil. Therefore, it has been extremely difficult for a primary coil 21 to detect whether a correct secondary coil was mounted or any other foreign object article was placed on the secondary side. However, by installing a detector coil 26 at a position which is off the primary coil 21 and closer to a secondary coil 23 on a ferrite core 22 as shown in FIG. 2 so that the detector coil 26 is hardly influenced by the primary coil 21 and readily affected by the secondary coil 23, the voltage induced in the detector coil 26 reflects the changes in condition of the secondary side since the detector coil 26 is more closely coupled with the secondary coil 23 than with the primary coil 21.

Because of the above reason, by monitoring the voltage of the detector coil 26, it can be known that whether what is connected to the DC power supply unit is the secondary coil 23 connected to a rectifying circuit or some foreign object having low impedance like a shorting ring.

According to the output voltage of the detector coil 26, the high frequency currents fed to the primary coil 21 can be made low in magnitude or flowing intermittently, thereby preventing a temperature rise of the foreign object.

In FIG. 2, the reference numerals 24 and 25 are a primary enclosure and a secondary enclosure, respectively.

(Exemplary Embodiment 3)

Figure 3:
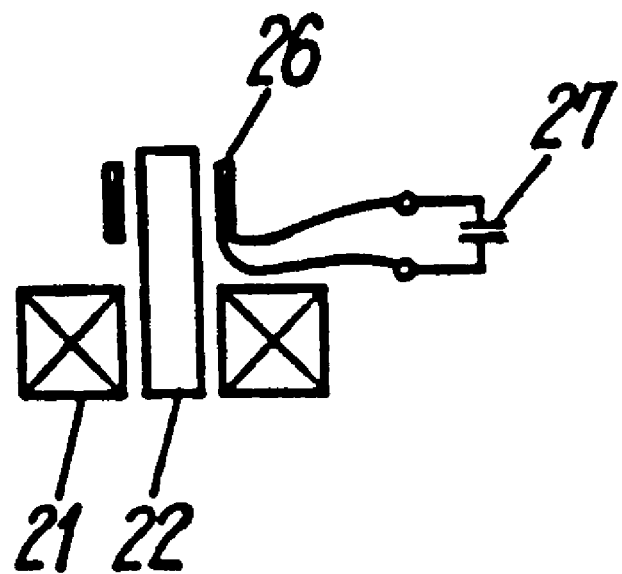
FIG. 3 shows a construction of a transformer performing an important function in still another exemplary embodiment of the present invention of a power supply unit.

FIG. 3 also shows still another exemplary embodiment of the present invention.

As shown in FIG. 3, a resonance capacitor 27 is connected across both ends of the detector coil 26 that is installed as described in Exemplary Embodiment 2, and the changes in condition of the secondary side are amplified, thereby enabling the detection of foreign objects to be performed readily and reliably.

As described in the above, the exemplary embodiments of FIG. 1 to FIG. 3 employ a slender ferrite core simply arranged to extend from a primary coil to a secondary coil and can realize a non-contact type DC power supply unit, whereby efficient transmission of electric power from the primary side to the secondary side is made possible. In addition, with a version that has a detector coil provided to the ferrite core, it is made possible to realize an extremely safe non-contact type DC power supply, whereby detection of foreign objects is performed without using a mechanical switch, a magnetic switch and the like.

(Exemplary Embodiment 4)

Figure 4:
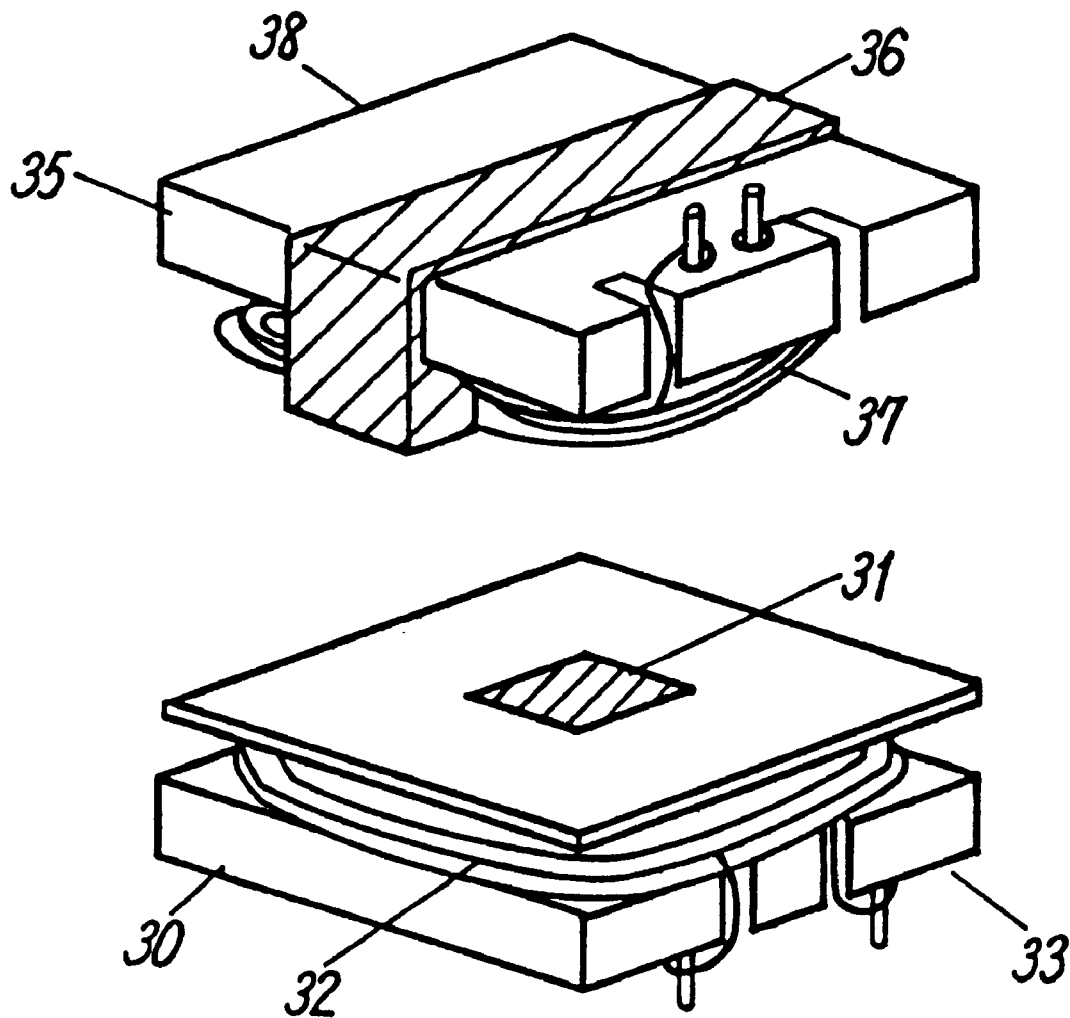
FIG. 4 is an exploded perspective view of a transformer performing an important function in still another exemplary embodiment of the present invention of a power supply unit.
Figure 5:
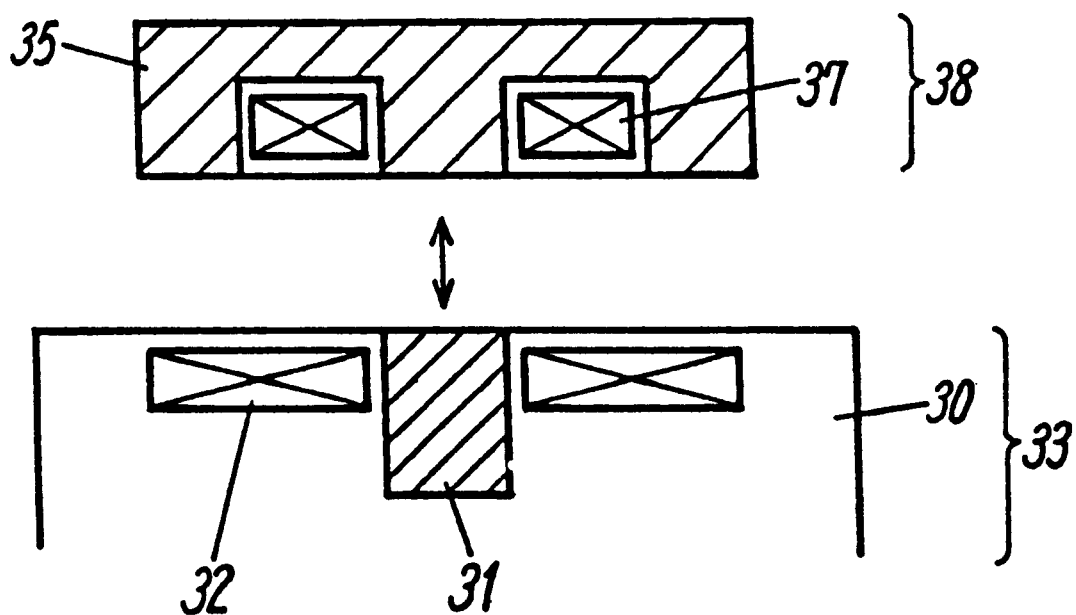
FIG. 5 is a cross-sectional view of the transformer described in FIG. 4.

FIG. 4 and FIG. 5 show still another exemplary embodiment of the present invention.

As shown in FIG. 4 and FIG. 5, a primary unit 33 contains a primary bobbin 30 with an I type core serving as a primary core 31 that is erected in the center thereof, and further a primary coil 32 is wound around the I type core 31.

Similarly, a secondary unit 38 contains a secondary bobbin 35 with an E type core serving as a secondary core 36 that is provided in the center thereof, and further a secondary coil 37 is wound around the middle leg of the secondary core 36 so that the secondary coil 37 is located between the middle leg and the outside legs of the secondary core 36.

Next, how a non-contact type DC power supply unit constructed as described in the above performs will be explained. When high frequency currents flow in the primary coil 32 that is wound concentrically, magnetic fluxes are produced in the primary coil 32 and also in the primary core 31 that is located in the center of the primary coil 32. Since an E type core was used with the primary coil in the prior art, a short circuit of magnetic fluxes is established between the middle leg and the outside legs of the E type core. As proposed by the present invention, use of an I type core as the primary core 31 eliminates the short circuit of magnetic fluxes within the primary core 31. In addition, magnetic fluxes that leave the cross-sectional surface of one end of the primary core 31 follow a large loop, pass through the secondary unit 38 and return to the primary core 31 on the cross-sectional surface of the other end thereof. In other words, use of an I type core as the primary core 31 makes it easier for magnetic fluxes to pass through the secondary unit 38.

Furthermore, in order for the magnetic fluxes to leave the primary core 31 in a centrally concentrated manner, the use of an I type core as the primary core 31 is extremely effective.

Since the magnetic circuit is formed to establish an open magnetic circuit, magnetic fluxes leave the primary enclosure 33 in many directions. For enhanced efficiencies, it is necessary for the opposing secondary unit 38 to pick up as many magnetic fluxes as possible by achieving magnetic coupling in a wide range. For achieving the foregoing, it is useful for the secondary unit 38 to employ a structure wherein an E type core is used as the secondary core 36.

As explained in the above, the use of the I type primary core 31 located in the center of the primary coil 32 and also the E type secondary core 36 together with the secondary coil 37, as proposed by the present invention, makes the construction of a power supply unit simple, thereby allowing the power supply unit to be made smaller, and at the same time contributes to the realization of a non-contact type power supply unit of excellent efficiencies and high reliability, whereby a larger output supply of power becomes achievable.

(Exemplary Embodiment 5)

FIG. 6 shows still another exemplary embodiment of the present invention.

Figure 6A:
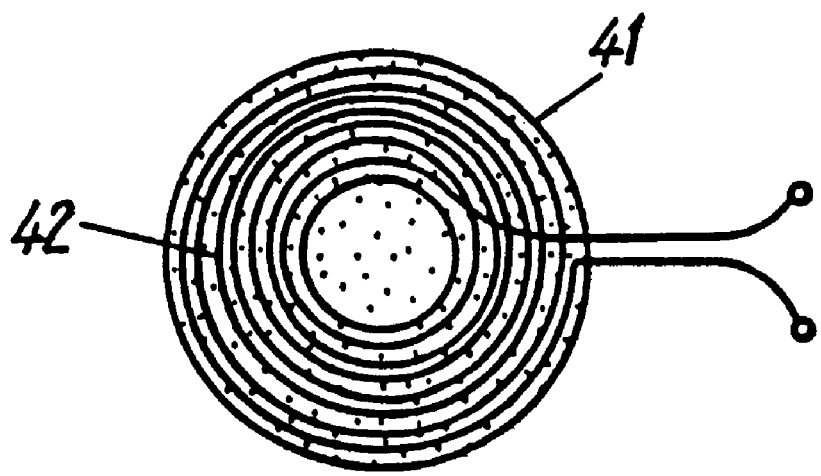
FIG. 6(a) is a front view of a secondary coil as used in a transformer performing an important function in still another exemplary embodiment of the present invention of a power supply unit.

FIG. 6(a) shows how a secondary unit 40 is structured. A flat T type core is used as a secondary core 41 and a secondary coil 42 is wound around the protruding part of the T type core.

Figure 6B:
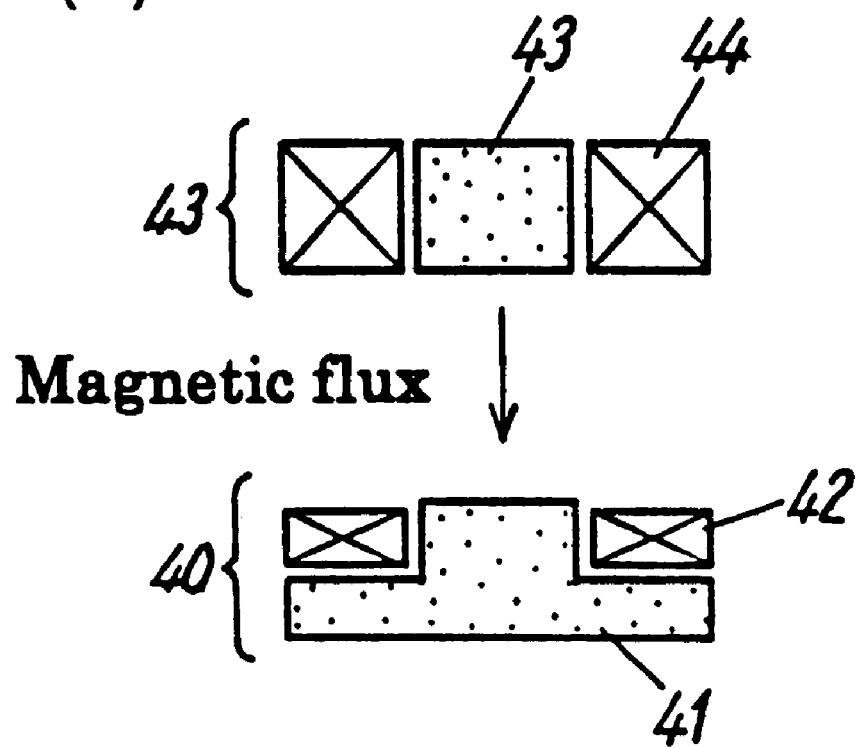
FIG. 6(b) shows how the primary and secondary coils are constructed in the transformer as referred to in FIG. 6(a).

FIG. 6(b) is a cross-sectional view of a transformer that is formed of a primary unit 43 and a secondary enclosure 40 and performs an important function in a power supply unit. When high frequency currents are fed to a primary coil 44, the primary unit 43 radiates magnetic fluxes in the direction of the secondary unit 40. At this time, since the magnetic circuit forms an open magnetic circuit, the magnetic fluxes from the primary unit 43 are radiated in many directions. In order to enhance transmission efficiencies, it is necessary to have the magnetic fluxes from the primary unit 43 converged and as many magnetic fluxes as possible picked up by the secondary unit 40. Therefore, an I type core is used as a primary core 31 and a flat T type core is used as a secondary core 41, thereby realizing a structure wherein the magnetic fluxes radiated from the primary unit 43 are converged and picked up by the entire surfaces of the secondary core 41. As a result, the transmission efficiencies are improved greatly and the thickness of the secondary unit 40 is allowed to decrease.

The T letter cross-section flat core used as the secondary core 41 is allowed to have a configuration, the top surface of which can be circular, oval, rectangular or polygonal.

(Exemplary Embodiment 6)

FIG. 7 shows still another exemplary embodiment of the present invention, which is the same as Exemplary Embodiment 5 except that a secondary coil 45 is formed of a printed wiring board 46.

Figure 7A:
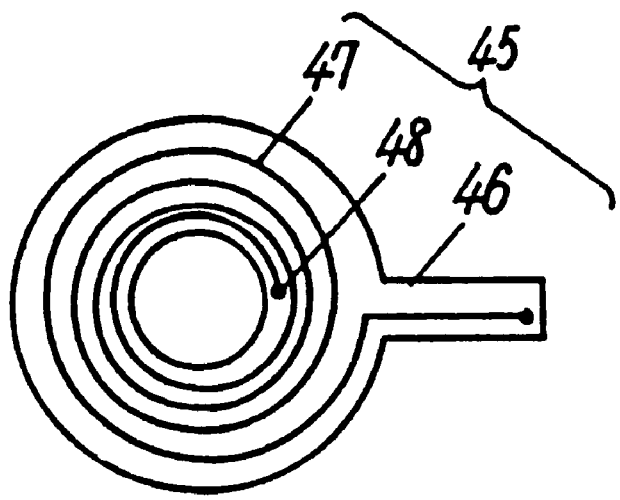
FIG. 7(a) is a top view of a printed wiring board used as a secondary coil of a transformer performing an important function in still another exemplary embodiment of the present invention of a power supply unit.
Figure 7B:
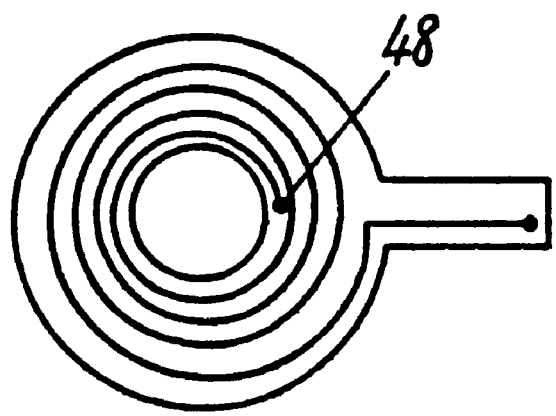
FIG. 7(b) is a bottom view of the printed wiring board of FIG. 7(a).
Figure 7C:
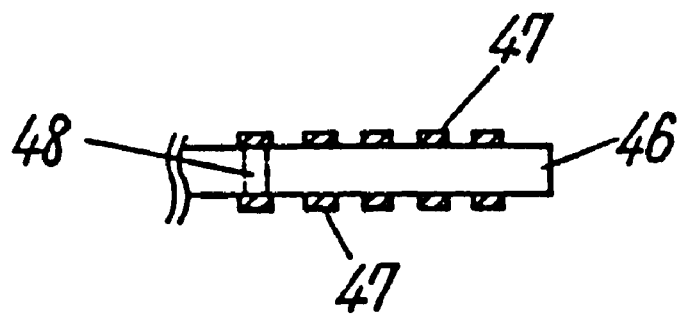
FIG. 7(c) is a side view of the printed wiring board of FIG. 7(a).
Figure 8:
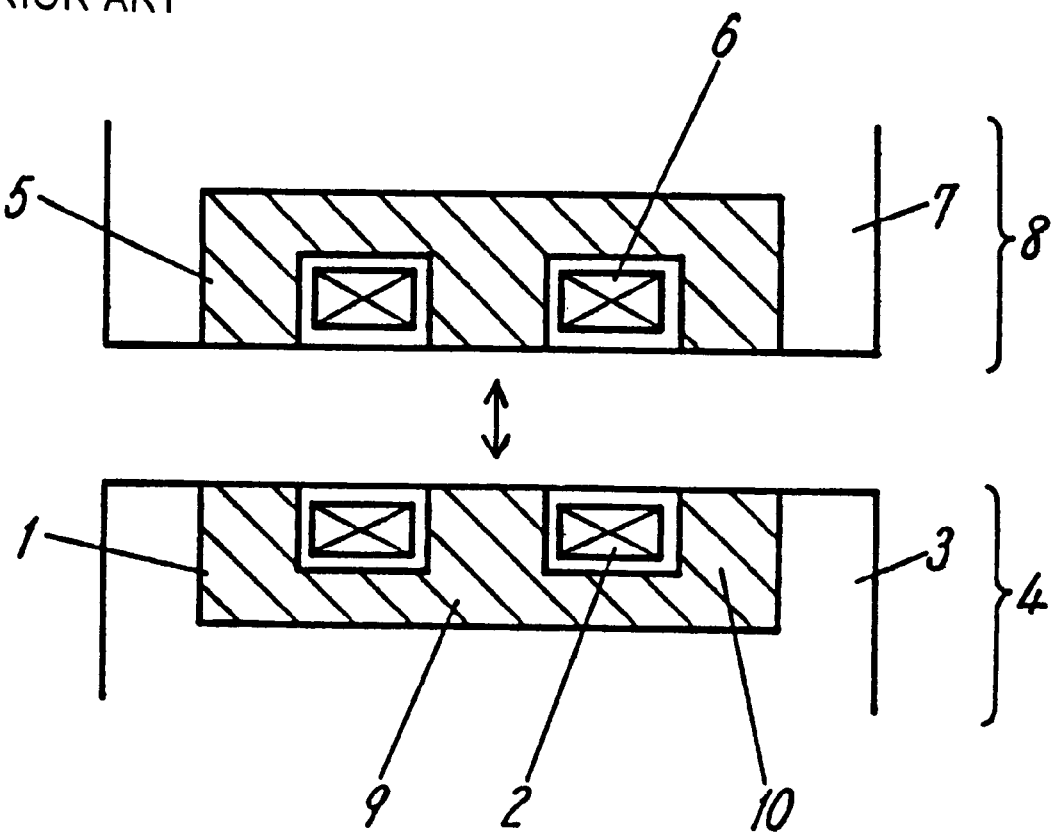
FIG. 8 shows how the primary and secondary coils are constructed in a transformer performing an important function in a prior art power supply unit.
Figure 9:
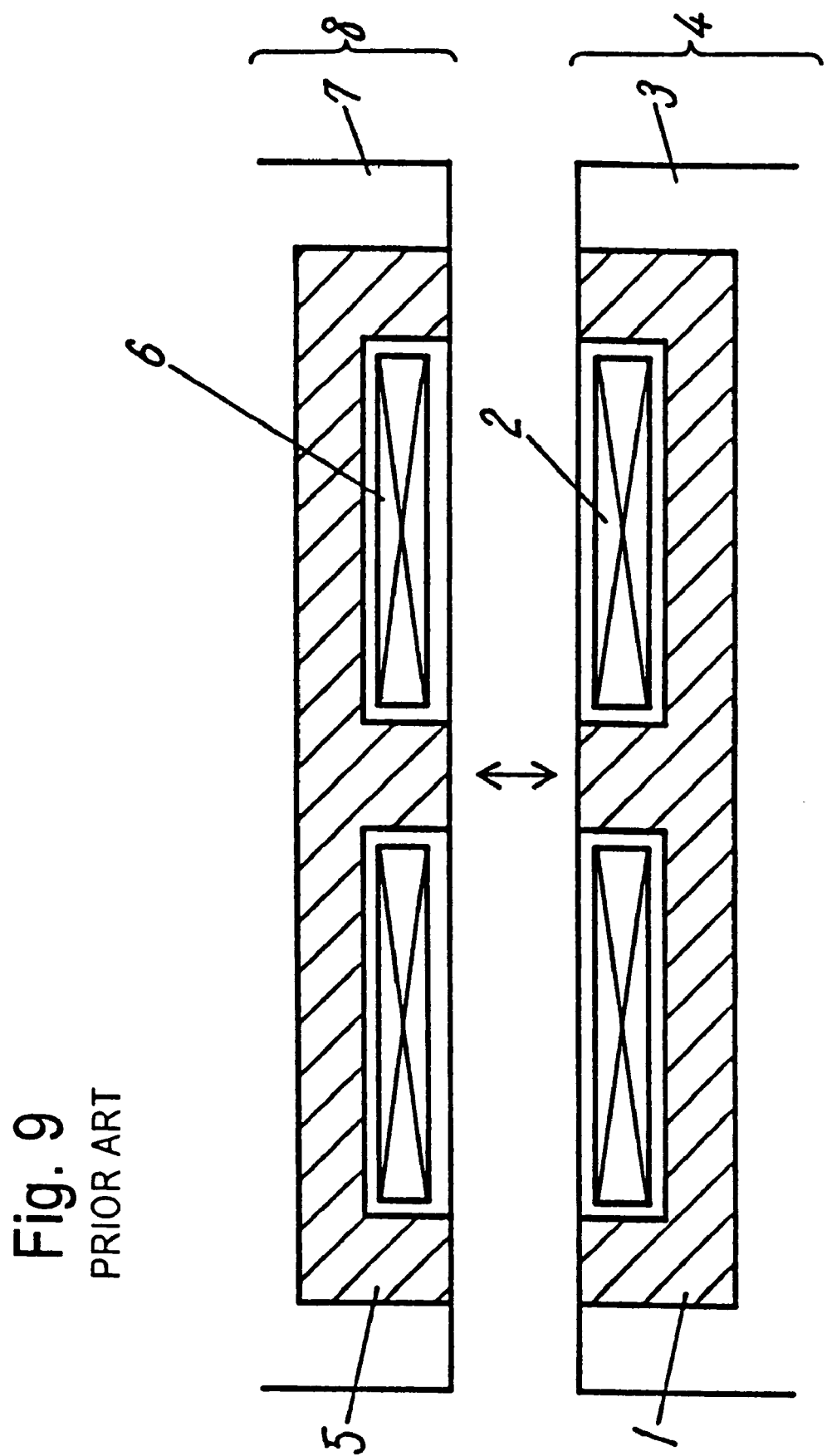
FIG. 9 shows how the primary and secondary coils are constructed in a transformer performing an important function in another prior art power supply unit.
Figure 10A:
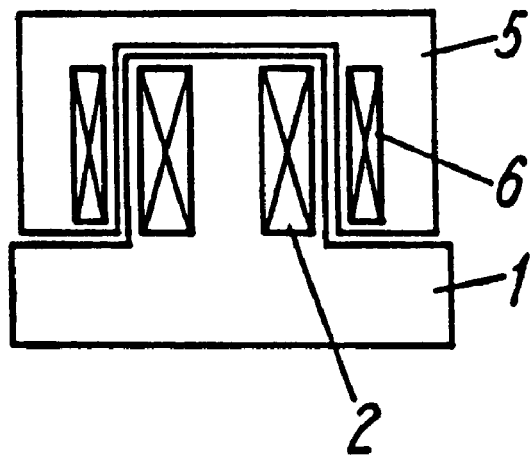
FIG. 10(a) shows how the primary and secondary coils are constructed in a transformer performing an important function in still another prior art power supply unit.
Figure 10B:
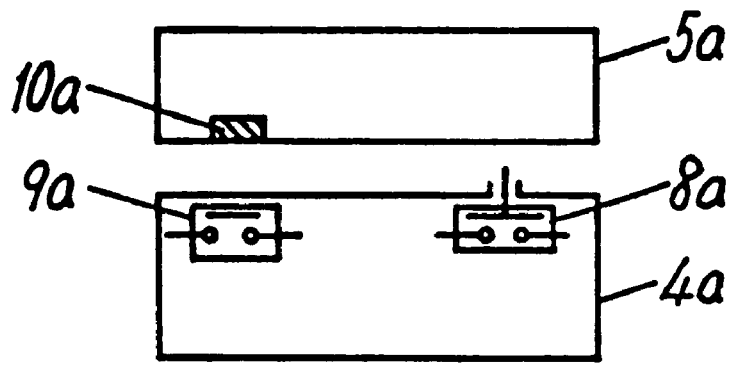
FIG. 10(b) shows how the primary and secondary coils are constructed in a transformer performing an important function in still another prior art power supply unit.

FIG. 7(a) shows the upper surface of the printed wiring board 46. FIG. 7(b) and FIG. 7(c) show the lower surface and the cross-section of the printed wiring board 46, respectively.

As shown in the foregoing drawings, concentric coil patterns 47 are formed on the upper and lower surfaces of the printed wiring board 46 and the upper surface and lower surface patterns 47 are connected with each other by means of a through hole 48 located towards the inside of the coil patterns 47. Accordingly, the coil patterns 47 can pick up magnetic fluxes radiated from a primary unit in the same way as a generally used secondary coil able to, and at the same time makes it possible to reduce further the thickness of a secondary unit.

As mentioned in the foregoing, the present exemplary embodiment is the same as the Exemplary Embodiment 5 except that the secondary coil 45 is formed of the printed wiring board 46. Therefore, the configurations of the secondary coil 45 can be circular, oval, rectangular or polygonal. Also, the printed wiring board 46 can be double-sided, single-sided or multi-layered.

With the exemplary embodiments as described in FIG. 6 and FIG. 7, the use of a flat T type core has made it possible to realize a flat type secondary coil having a simple construction with the resulting realization of an efficient non-contact type power supply unit having a high degree of reliability and contribution to a downsizing of the equipment wherein the power supply unit is incorporated. In addition, since the outside magnetic legs as existed with an E type core are eliminated in the T type core, a further reduction in cost is made possible when compared with the E type core, thus providing a great benefit to the industry.

Benefits for the Industry

As described in the foregoing, the present invention can provide a power supply unit that achieves an excellent power transmission efficiency with a simple construction, enables the equipment using the power supply unit to achieve a downsizing, contributes to a cost reduction and operates with a high degree of reliability.

Particularly, a version provided with a ferrite core that is inserted in the primary coil and extends towards the secondary coil can transfer efficiently the magnetic fluxes produced in the primary coil to the secondary coil.

Another version provided with a tertiary coil that is located on the foregoing ferrite core where no primary coil is in place can detect foreign objects with a high degree of reliability because of the use of the foregoing tertiary coil.

Still another version provided with the tertiary coil having a capacitor connected across both ends thereof can amplify the changes in condition of the secondary side, thereby conducting the detection of foreign objects more accurately.

Still another version with an I type core used in the primary coil and an E type core used in the secondary coil can contribute to a downsizing of the power supply unit and can realize a large power output.

Still another version with an I type core used in the primary coil and a T type core used in the secondary coil can realize a further downsizing of the power supply unit and can contribute to a cost reduction by requiring no core material for outside legs that would have been needed with an E type core.

What is claimed is:

1. A non-contact power supply unit having a primary coil to be fed with high frequency currents; and a secondary coil mounted opposite to said primary coil in an enclosure that is different from an enclosure wherein said primary coil is mounted, whereby electric power is transferred from said primary coil to said secondary coil; a ferrite core extending from said primary coil to said secondary coil, and a tertiary coil provided on said ferrite core at a place where said ferrite core is not surrounded by said primary coil.

2. The power supply unit according to claim 1, wherein a capacitor is connected across both ends of said tertiary coil.

3. A non-contact power supply unit comprising:

a primary coil to be fed with high frequency currents; and a secondary coil mounted opposite to said primary coil in an enclosure that is different from an enclosure wherein said primary coil is mounted, whereby electric power is transferred from said primary coil to said secondary coil and wherein opposing surfaces of said primary coil and secondary coil are made flat, an I shape primary core is provided in the center of said primary coil and an E shape secondary core is provided in said secondary coil.

4. A non-contact power supply unit comprising:

a primary coil to be fed with high frequency currents; and a secondary coil mounted opposite to said primary coil in an enclosure that is different from an enclosure wherein said primary coil is mounted, whereby electric power is transferred from said primary coil to said secondary coil and wherein said primary coil is wound around an I shape core and said secondary coil employs a coil or a printed wiring board with coil patterns formed thereon around a protruded part of said T shape core.

* * * * *